United States Patent [19]
Kaneko et al.

[11] Patent Number: 5,335,197
[45] Date of Patent: Aug. 2, 1994

[54] STORAGE MEDIUM, STORAGE METHOD AND STORED INFORMATION READING METHOD

[75] Inventors: Norio Kaneko; Katsuhiko Shinsho; Keisuke Yamamoto, all of Atsugi, Japan

[73] Assignee: Canon Kabushiki Kaisha, Tokyo, Japan

[21] Appl. No.: 804,593

[22] Filed: Dec. 10, 1991

Related U.S. Application Data

[62] Division of Ser. No. 500,569, Mar. 28, 1990, Pat. No. 5,097,443.

[30] Foreign Application Priority Data

Mar. 28, 1989 [JP] Japan ................................. 1-73744

[51] Int. Cl.$^5$ ............................................. G11C 13/00
[52] U.S. Cl. ..................................... 365/153; 365/129; 365/122
[58] Field of Search ............ 365/153, 129, 182, 189.01, 365/230.01, 122

[56] References Cited

U.S. PATENT DOCUMENTS 4,414,650  11/1983  Otha ................................. 365/122

*Primary Examiner*—Terrell W. Fears
*Attorney, Agent, or Firm*—Fitzpatrick, Cella, Harper & Scinto

[57] ABSTRACT

Disclosed are medium and methods for storage and reading of stored information. The storage medium comprises an oxide layer having a plurality of pits and projections on the oxide layer surface. Information storage is achieved by applying voltage or light, in accordance to information signals, to the oxide layer, to differentially heat said oxide layer and create a plurality of portions which contain different quantities of oxygen. Stored information is read by the application of voltage or light to the oxide layer containing a plurality of portions containing different quantity of oxygen and detection of the electrical resistance or light reflectivity of each of said plurality of portions.

35 Claims, 9 Drawing Sheets

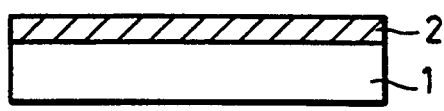
FIG. 1 (A)
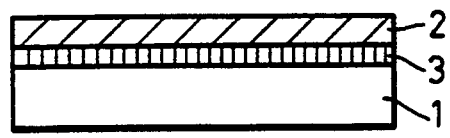
FIG. 1 (B)
FIG. 2 (A)
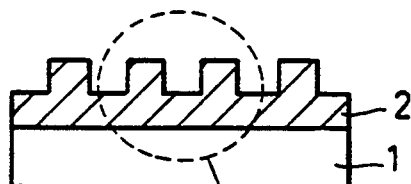
FIG. 2 (C)
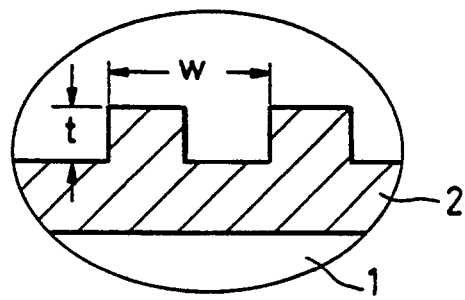
FIG. 2 (B)
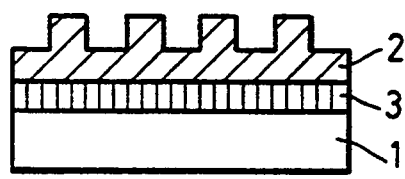

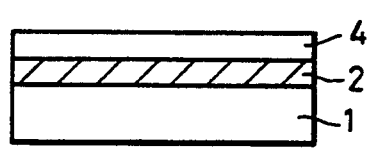
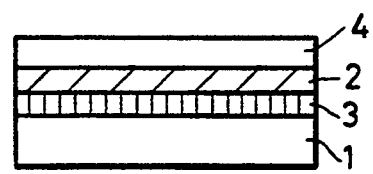
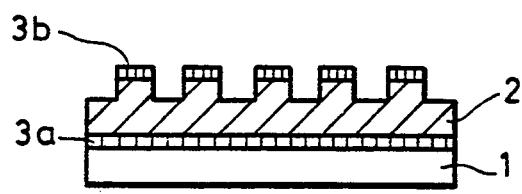
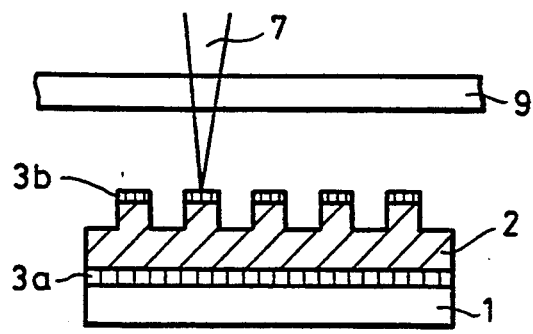

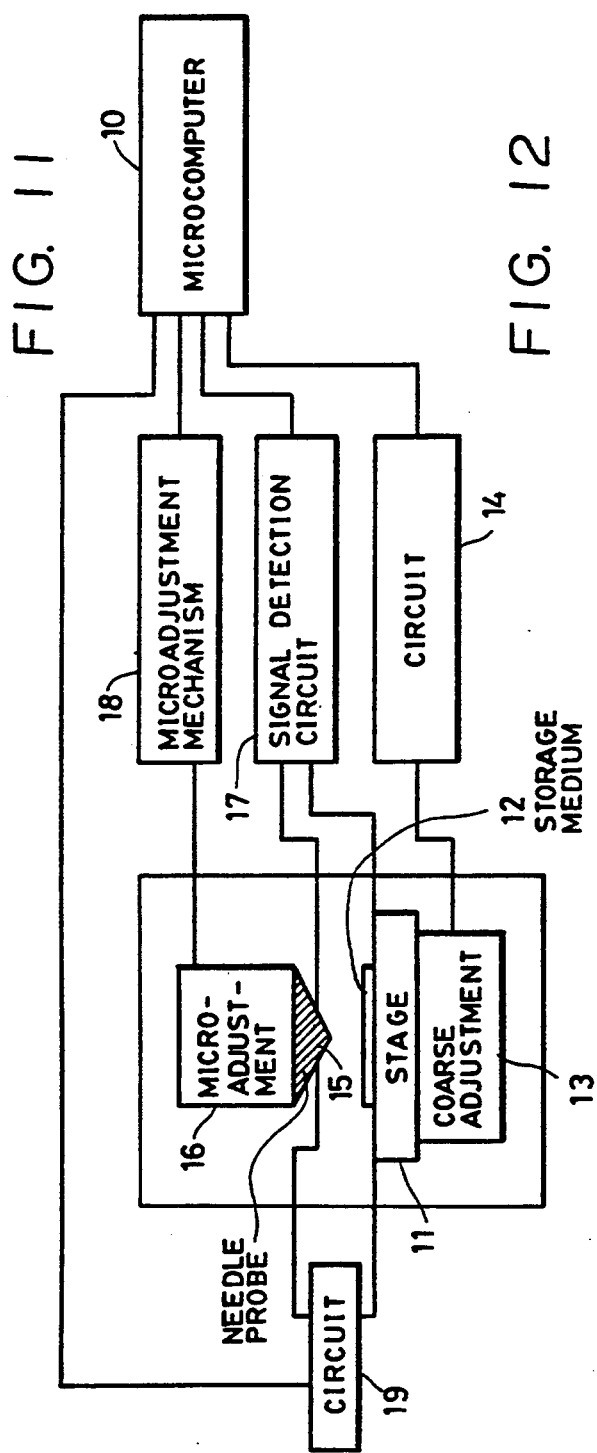
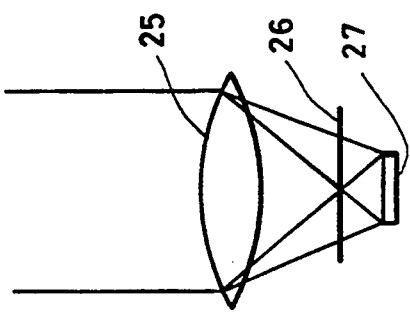

FIG. 18(A)
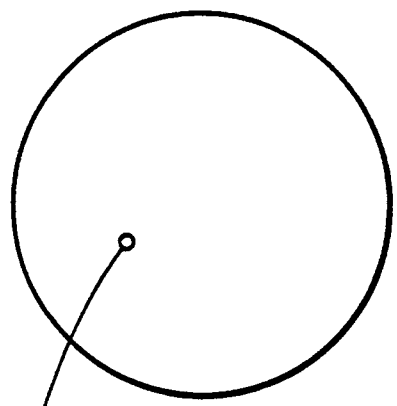
SEE FIG. 18(B)
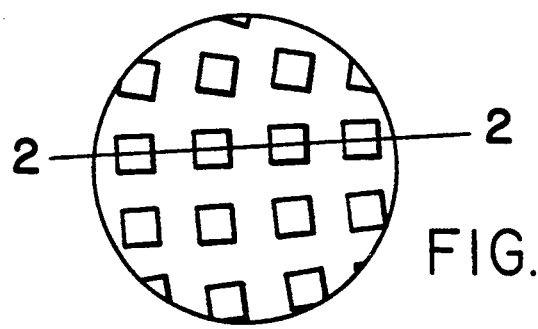
FIG. 18(B)
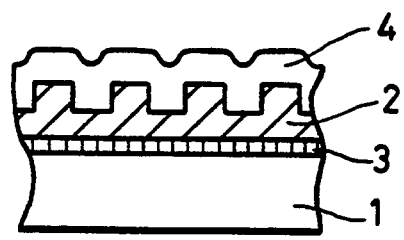
FIG. 18(C)

STORAGE MEDIUM, STORAGE METHOD AND STORED INFORMATION READING METHOD

This application is a division of application Ser. No. 500,569 filed Mar. 28, 1990 now U.S. Pat. No. 5,097,443.

BACKGROUND OF THE INVENTION

1. Field of the Invention

The present invention relates to a storage medium, a storage method and a stored information reading method for use in storing and/or reproducing information performed in computers, electronic cameras, or the like, and, more particularly, to a storage medium, a storage method and a stored information reading method which can be suitably used when a high density apparatus or a large capacity apparatus is realized and which can be used in a wide temperature range.

2. Description of the Prior Art

Hitherto, a magnetic material has been usually used in an information storage method employed in a large-capacity storage apparatus.

The information storage method is disclosed in, for example, "Magnetic Material Ceramics" on P.143 (edited by Sakurai and Kannamaru, published by Ohm Co., Ltd. 1976).

A method in which an oxide is employed to serve as the above-described storage medium was disclosed in Japanese Patent Laid-Open No. 63-268087 in which a superconductor is used so as to record and/or reproduce information at a temperature lower than the critical temperature of superconductivity.

When the magnetic material is used in the above-described conventional technologies, the magnetized state of the magnetic material is utilized. Therefore, it has been considered that there is a limit in the storage portion density to about one storage portion per $\mu m^2$ due to the reduction of the magnetic domain and the intensity of the signal to be detected.

A storage method utilizing a superconducting oxide is a method in which superconducting state and a normal state of a perovskite oxide are arranged so as to respectively correspond to binary signals and the transfer between the superconducting state and the normal state is achieved by irradiations of hydrogen ions and oxygen ions. However, in the above-described method, it is necessary to know whether a predetermined storage portion is in a superconducting state or normal state when reading information. Therefore, the storage medium must be maintained at temperatures below the critical temperature (Tc).

Since the critical temperature Tc in the case of an oxide can reach about 100K, cooling means such as a refrigerant for example liquid nitrogen or the like or a helium refrigerator is necessary. The necessity increases the size of the apparatus, creating a design and a limitation to arise when the apparatus is designed.

Since the transfer between the two states, superconducting state and the normal state, is utilized when information is recorded, the storage method utilizing the superconducting oxide can be used in only the binary digital recording apparatus. Therefore, it cannot be used in multi-valued recording apparatuses or analog recording apparatuses. Furthermore, since oxygen ions and hydrogen ions are used when information is recorded, a problem arises in that optical input signals such as video signals cannot be directly recorded.

SUMMARY OF THE INVENTION

Accordingly, an object of the present invention is to provide a storage method exhibiting a larger storage capacity than a case in which a magnetic material is used, capable of reading stored information without a necessity of using a special cooling medium such as liquid nitrogen, or liquid helium, a helium refrigerator, or a cooling system, and capable of multi-valued recording information or analog recording it.

A further object of the present invention is to provide a recording medium exhibiting excellent performance for recorded information.

A still further object of the present invention is to provide a recording medium in which recorded information can be reloaded.

A further object of the present invention is to provide a recording medium which can be readily positionally aligned when information is stored or read and capable of precisely storing and reading information.

These objects are accomplished, according to one aspect of the present invention, by a storage medium for use in recording and reproducing information, comprising an oxide layer wherein said oxide layer comprises a plurality of pits and projections. In another aspect of the invention, said oxide layer is held between a substrate and a protection layer, wherein said protection layer comprises an oxygen permeable or oxygen absorbable material. According to another embodiment of the invention, said oxide layer comprises an oxide which changes crystalline structure in response to a change in the quantity of oxygen contained therein.

Another aspect of the present invention provides methods for storing information comprising the steps wherein a storage medium comprising an oxide layer is prepared; and voltage or light is applied to portions of the oxide layer so as to heat the oxide layer in accordance with information signals; thereby forming a plurality of portions containing varying quantities of oxygen wherein information is stored. The method can further include in the preparation of said storage medium, a step wherein a plurality of pits and projections is provided in the oxide layer or a step wherein an oxide which changes crystalline structure in response to a change in the quantity of oxygen contained therein is provided in the oxide layer. The method may further comprise a step in which oxygen is depleted from the atmosphere surrounding said oxide layer.

Another embodiment of the present invention provides a method for reading stored information wherein voltage or light is applied to a medium comprising an oxide layer, wherein said oxide layer includes a plurality of portions containing varying oxygen concentrations, and detecting the electrical resistance or light reflectivity of each of said plurality of portions, whereby information is read. Further steps which may be incorporated in the method include a step in which a plurality of pits and projections is included in said oxide layer or a step in which an oxide which changes crystalline structure in response to changes in the oxygen contained therein is used to form said oxide layer.

BRIEF DESCRIPTION OF THE DRAWINGS

Other and further objects, features and advantages of the invention will appear more fully from the following description.

FIGS. 1A and 1B are basic structural views which illustrate a storage medium for use in a method according to the present invention;

FIGS. 2A, 2B, 2C, 3A, 3B, 4A, 7, 13A, 13B, 17A, 17B, 18A, 18B, 18C and 19 illustrate storage media according to the present invention;

FIGS. 4B, 8, 10, 11 and 12 illustrate the method according to the present invention.

DESCRIPTION OF THE PREFERRED EMBODIMENTS

Figure 5:
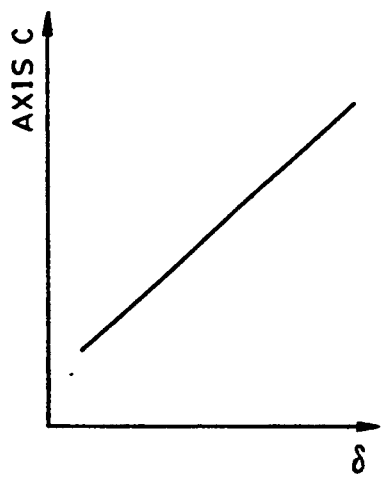
FIGS. 5, 6, 9, 14, 15 and 16 illustrate changes in the physical properties of the storage medium used in the method according to the present invention.

The present invention is mainly characterized in that the quantity of oxygen contained in an oxide is controlled with heat, states where the oxygen content in the oxide is large and small are utilized, and the change in the states is arranged to correspond to signals.

For example, the crystal structure $YBa_2Cu_3O_{7-x}$ ($0 \leq X \leq 1$) is tetragonal when x is substantially larger than 0.5, while it is orthorhombic when x is smaller than 0.5. The electrical resistivity due to the change in the oxygen quantity at a temperature near room temperature becomes larger in the case of the tetragonal structure.

Furthermore, the electrical resistivity of the tetragonal structure is in inverse proportion to the oxygen quantity. Also the optical characteristic, for example, the reflectivity is in inverse proportion to the oxygen quantity, that is in inverse proportion to x. The absorptance is also changed by the oxygen quantity similarly to the reflectance. The above-described physical property change similarly takes place in the orthorhomobic structure. The change in the oxygen quantity can be controlled by performing electrolysis or applying an electric current or light regardless of the temperature of the oxide. Furthermore, the oxygen quantity in an oxide can be successively changed by the intensity of an input signal such as voltage, an electric current, and light.

The present invention is characterized in that various information are recorded by utilizing a change in an electrical and/or optical physical property such as electric resistivity, absorptance and reflectance due to the above-described change in the oxygen quantity in the oxide.

Another characteristics is that the difference in the electrical or optical characteristic is stored in a multi-valued or a successive manner so as to be used in the multi-valued recording or the analog recording.

The storage method according to the present invention will now be described in detail.

The storage method according to the present invention is characterized in that information is stored by forming a plurality of portions in an oxide layer which contains oxygen by a different quantity by locally heating a medium having the oxide layer.

The above-described description "locally heating the medium having the oxide layer" means an operation of applying heat of desired energy to a desired portion on the surface of the oxide layer of the medium (to be called "the storage medium" hereinafter) in accordance with information signals. It is preferable that voltage be applied and an electric current be passed through the oxide layer of the storage medium so as to heat the oxide layer. Alternatively, the oxide layer is heated with light applied thereto.

It is further preferable that the above-described heat application be performed in an atmosphere lacking in oxygen since oxygen in the heated portion of the oxide layer can be easily discharged, causing the contrast between the heated portion and the other portions to be made obvious. The description "the atmosphere lacking for oxygen" means an atmosphere realized by exhausting air from the portion surrounding the medium so as to preferably realize $1 \times 10^{-2}$ torr or lower or that realized by substituting the gases around the medium by an inert gas such as nitrogen gas.

Since information is stored by locally heating the oxide in the storage method according to the present invention, light is also used as the heating means as described above. Therefore, optical input signals such as image signals can be directly stored.

The voltage is applied to the oxide layer of the storage medium by using, for example, a probe electrode supported in the vicinity of the storage medium in such a manner that desired level of voltage is applied between the thus supported probe electrode and the storage medium. Although the structure may be arranged regardless of a fact whether or not the probe electrode positioned in contact with the surface of the storage medium, it is preferable in the method according to the present invention that the probe be positioned in contact with the surface of the storage medium since an area per one storage portion can be reduced and a high density recording can be performed. The reason for this lies in that the method according to the present invention is, as described above, the method in which information is stored by controlling the oxygen quantity contained in an oxide with heat.

Because of the same reason, it is preferable that the distance from the probe electrode to the surface of the storage medium be 5 Å to 50 Å even if the probe is arranged to be positioned in non-contact with the recording medium.

Light application to the oxide layer of the storage medium is performed by a digital exposure using laser beams by a method in which an optical image is formed on the surface of the storage medium, or the like.

Furthermore, information can be stored in a multi-valued manner or an analog manner in the storage method according to the present invention. The above-described method in which an optical image is directly formed on the surface of the storage medium is an example of this method. Furthermore, in an exposure using laser beams, the multi-valued information recording or the analog recording can be performed by controlling the intensity of laser beams to be applied in accordance with information signals. In addition to the storage achieved by the light application, the above-described voltage application to the oxide layer can be arranged to be capable of performing multi-valued storage or analog storage by controlling the level of the applied voltage or the number of the Voltage applications in accordance with the information signals even if voltage of the same level is applied.

As described above, the storage method according to the present invention is arranged in such a manner that the electrical or optical physical property of an oxide used as a storage medium is changed successively in accordance with the successive change in the oxygen quantity in accordance with the quantity of applied energy. Therefore, information can be stored in the multi-valued or analog manner by utilizing heat.

Information thus stored in the storage medium can be read as follows: voltage is applied to the oxide layer of the storage medium and the level of the electric resistance of each of a plurality of portions containing oxygen by a different quantity is detected, so that information can be read. Alternatively, information can be read by detecting the light reflectance of a plurality of portions each of which contains oxygen by a different quantity after light has been applied to the oxide layer of the storage medium.

Since the oxide used as the storage medium displays the successive change in the electrical or optical property in the method of reading the stored information according to the present invention, multi-valued or analog information can be readily read from a storage medium which has stored, in the multi-valued or analog manner, information by detecting the above-described successive change in the physical property.

The information stored by the storage method according to the present invention can be deleted by heating the oxide layer. That is, the information can be deleted by supplying oxygen to the portion of the oxide layer lacking for oxygen which has been caused to store information by heat. In this case, heat may be applied by applying voltage to the oxide layer or by applying light to the same. Alternatively, the oxide layer may be directly heated by a heater. The storage medium from which information has been thus deleted can, of course, store novel information.

A storage medium used in the storage method according to the present invention will now be described in detail.

The storage medium for use in the storage method according to the present invention must include at least a layer 2 made of an oxide as shown in FIGS. 1A and 1B. It is preferable that the oxide be an oxide whose crystal structure is changed due to a change in the oxide quantity. The oxide can be exemplified by an oxide which can be transferred to a superconducting state at temperatures lower than the specific temperature thereof. Furthermore, main portions of oxides such as oxides structured as Y-Ba-Cu-O, In-Sn-O, Bi-Sr-Ca-O, Tl-Sr-Ca-Cu-O, Ti-O, or the like can be used. It is preferable that the usual thickness of the oxide layer be 500 Å to 5 $\mu$m.

Referring to FIGS. 1A and 1B, reference numeral 1 represents a substrate, and reference numeral 3 shown in FIG. 1B represents an electrode. The electrode (3) shown in FIG. 1B is a counter electrode of a probe electrode used when information is stored by applying voltage to the storage medium or information stored in the storage medium is read by applying voltage to the storage medium. Referring to FIG. 1B, an electrode (omitted from illustration) may be further provided on the top surface of the oxide layer (2). However, the above-described electrodes can be omitted from the structure in the case where the oxide layer has conductivity.

A preferable embodiment of the storage medium for use in the storage method according to the present invention lies in a storage medium whose surface has an oxide layer on which pits and projections are formed. Another embodiment lies in a storage medium whose structure is arranged in such a manner that the oxide layer is held between the substrate and a protection layer.

Each of the above-described embodiments will now be described with reference to the drawings.

FIGS. 2A, 2B, and 2C illustrate the storage medium whose surface has the oxide layer on which the pits and projections are formed, where reference numerals correspond to the elements shown in FIG. 1. According to this embodiment, information can be precisely written (stored) and read by forming the pits and the projections on the surface of the oxide layer (2). That is, since the storage method according to the present invention is arranged to use heat, the structure arranged in such a manner that the above-described pits and projections formed so as to make the projection portions (or the pit portions) to be the storage portions is able to prevent deterioration in the writing precision. It is preferable that the storage portion be arranged to the projection portions to achieve an improvement in the precision and easy reading of the information. Furthermore, the probe electrode can be readily positioned at the time of the writing and the reading operations. According to this embodiment, it is preferable that the above-described pits and projections be formed so as to have an interval (symbol W shown in an ellipse shown in FIG. 2C) of 1 $\mu$m to 4000 Å between the projections and a height of the projection (symbol t shown in an ellipse shown in FIG. 2C) of 3 $\mu$m to 2000 Å.

FIG. 2B illustrates the storage medium according to this embodiment in which the counter electrode 3 of the probe electrode used when information is stored or stored information is read by applying voltage to the storage medium is disposed. Another electrode (omitted from illustration) may be formed on the top surface of the oxide layer 2.

FIGS. 3A and 3B illustrate the storage medium structured in such a manner that the oxide layer is held between the substrate and the protection layer, where reference numerals 1, 2 and 3 correspond to the elements shown in FIGS. 1 and 2. A protection layer (4) may be made of any material capable of protecting the oxide layer or information stored on the oxide layer from water or the like present around the storage medium at the time of reserving the storage medium or at the time of storing information. It is preferable that the protection layer (4) be structured to be either of the following two protection layers:

(1) a protection layer made of an oxygen permeable material (2) a protection layer made of an oxygen absorbable material It is preferable that the oxygen permeable material be a substance selected from Ag and Si oil and the oxygen absorbable material be a substance selected from Al, Ti and Cr. Although information stored in the storage medium having the protection layer (1) can be deleted so as to use the storage medium again, the storage medium having the protection layer (2) can be used in only information storage operation.

The use of the protection layer of either of the above-described two types is extremely useful in terms of making the contrast clear at the time of storing information or improving deletion efficiency at the time of deleting the stored information since a reserving condition of the oxide layer or information stored in the oxide layer can be improved and oxygen discharge (or oxygen introduction) is not hindered.

It is preferable that the film thickness of the protection layer (4) according to this embodiment be 2000 Å to 5000 Å.

It is preferable that the pits and the projections formed as shown in FIG. 2 be employed in the present embodiment since the storage medium can be formed in the structure which can display the effect similar to the above-described embodiment. However, the pits and projections according to this embodiment may be structured in any way if the pits and projection are formed on the surface (the surface on which information is written or the surface from which information is read) of the storage medium. It is not necessary for the oxide layer to have the pits and projections. That is, the oxide layer may be formed flat or structured by forming t, he protection layer to be in the form of the pits and projections.

The effect as that obtained from the structure shown in FIG. 3 can, of course, be obtained from the structure shown in FIG. 2 if the protection layer is formed on the surface of the oxide layer.

As described above, according to the present invention, the recording density can be improved by three to four figures in comparison to the figures realized when the conventional magnetic material is used. Furthermore, since the necessity of cooling the recording medium which arises when the transfer between superconducting state and normal state is utilized can be eliminated, it can be used at room temperature. Furthermore, since the oxygen quantity can be successively changed in accordance with the intensity level of the input signal, the multi-valued recording can be performed. In addition, the direct recording can be performed even if the input signal is in the form of an optical signal.

Furthermore, a storage medium exhibiting excellent performance of reserving stored information can be provided.

In addition, a storage medium in which stored information can be reloaded can be provided.

Furthermore, a storage medium, in which information can be written (stored) and read precisely and which can be easily positioned at the time of storing information and reading information, can be provided.

EXAMPLE 1

A storage medium shown in FIG. 4 was manufactured.

Reference numeral 1 represents a substrate, made of a single crystal magnesium oxide (MgO). Reference numerals 3a and 3b represent electrodes where (3a) represents a silver (Ag) evaporated film and (3b) represents an ITO evaporated film. Reference numeral 2 represents a $YBa_2Cu_3O_{7-\delta}$ oxide.

The method of manufacturing the storage medium was as follows: first, a silver electrode was evaporated so as to have a thickness about 5,000 Å on the magnesium oxide substrate 1 by vacuum evaporation. Then, the $YBa_2Cu_3O_{7-\delta}$ oxide was evaporated to form a film thickness of about 1 μm by the RF magnetron spattering method before being heated to about 900° C. for one hour so that the oxygen deficiency in the oxide was made nearly equal to 0.59. Then, the ITO electrode was evaporated so as to form a film thickness of 4,000 Å. The thus formed ITO electrode was arranged so as to form projections at intervals of 0.5 μm by a usual patterning technology as shown in FIG. 4A. The height of the projection was 7,000 Å with the electrode portion included.

The thus manufactured storage medium was vacuum-sealed by using quartz glass reference numeral 9. The internal pressure was about $3 \times 10^{-3}$ torr. The size of one storage element (the projection portion of the oxide (2) was $0.5 \times 0.5$ μm² and 5 elements of this size were arranged in one dimensional manner. The electrical resistance between the ITO electrode and the silver electrode was about 1 to 10 Ω at room temperature. When laser beam reference numeral 7 (wavelength: 780 nm, output: 10 mW) was applied to the ITO electrode portion as shown in FIG. 4B, the electrical resistance between the two electrodes was enlarged than that at the portion at which no laser beam was applied. The reason for this lies in that the temperature at the portion applied with the laser beam (7) was raised, oxygen contained in the oxide in the projection portion was thereby removed and the electrical resistance at room temperature was changed. Information stored in the oxide could be read by reading the change in the electrical resistance.

Figure 6:
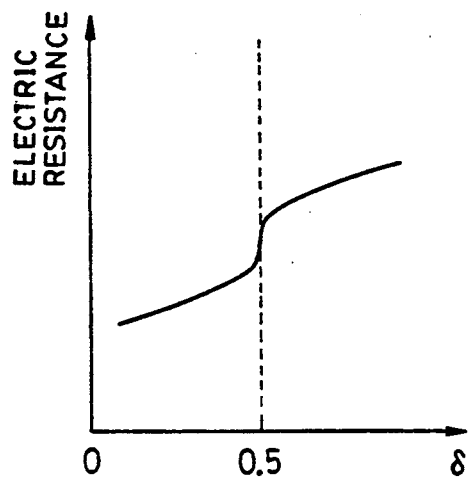

The oxygen deficiency δ was determined in accordance with the length of axis C by the X ray diffraction method, the relationship between them being shown in FIG. 5. Correctly, the relationship between 5 and the electric resistance relates to the composition ratio of Y, Ba and Cu. However, the relationship as shown in FIG. 6 is usually held.

EXAMPLE 2

Figure 7:
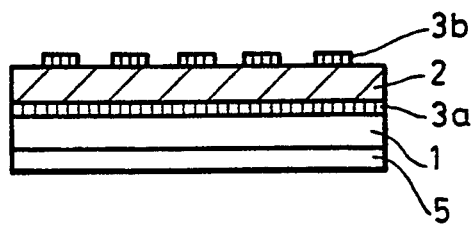

A storage medium shown in FIG. 7 was manufactured. The manufacturing method was the same as that according to the first example, except pits and the projections were not formed on the surface of the storage medium and δ denoting the oxygen deficiency of the oxide layer 2 was 0.42. Reference numeral 5 disposed below the substrate 1 of the storage medium is a heater for heating the storage medium at about 60° C.

The electrical resistance between the electrodes 3a and 3b was 10 to 15 Ω at 60° C., and was increased by about 15% by the laser beam application performed similarly to Example 1 so that information could be stored.

The stored information could be deleted by heating the overall body of the element at 80° C. using the heater (5).

EXAMPLE 3

Figure 8:
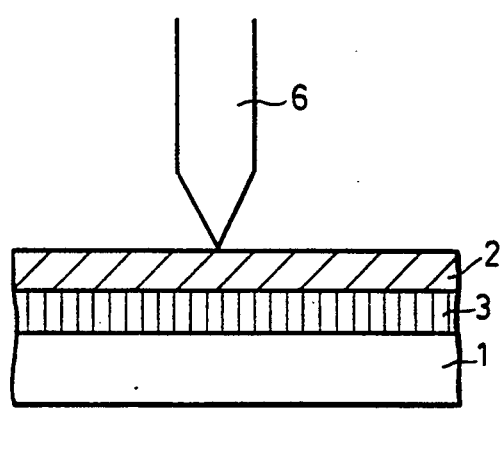

FIG. 8 is a schematic view which illustrates the storage method according to this example.

Reference numeral 6 represents a needle electrode for writing and reading information, 2 represents the oxide specific structure of which is $YBa_2Cu_3O_{7-x}$ and 3 represents the electrode where gold (Au) was used according to the present invention. Reference numeral 1 represents the substrate. The portions given the reference numerals 1, 2 and 3 form the storage medium. The needle electrode and the storage medium were held in a airtight container in which an electric controlled valve and an exhaust pump were disposed.

The method of manufacturing the storage medium was as follows: first chrome (Cr) and gold was evaporated by the vacuum evaporation method so as to respectively form 10 nm and 300 nm thick films on a glass (for example, Coning 7059) serving as the substrate so that the electrodes were formed. Then, $YBa_2Cu_3O_{7-x}$ was formed so as to make the thickness 100 nm by the ionized cluster beam evaporation method.

The storage medium was thus manufactured. Then, the pressure in the airtight container was lowered to $3 \times 10^{-3}$ torr and a voltage of 2 V was applied between the needle electrode (6) and the electrode (3). The portion to which the electric field was applied displayed reduced oxygen content and increased electrical resistance. When a bias voltage of 1 V was applied to the portion to which no voltage had been applied, an electric current of $10^{-3}$ passed through this portion, while the portion to which the electric field had been applied, only a small electric current of $10^{-3}$ to pass through it. Therefore, it was confirmed that a signal could be recorded with the electric voltage of 2 V and a signal could be read with a 1 V bias voltage.

The recorded signal could be deleted by opening the valve to raise the pressure in the airtight container to the atmospheric pressure and by heating the temperature to about 100° C. All of the signals could be deleted by heating the overall body of the storage medium, while a portion of the signals could be deleted by applying laser beams or voltage to the needle electrode (6) and the oxide (2). The storage medium from which information had been deleted could store information again by the above-described method.

EXAMPLE 4

The storage medium was manufactured similarly to Example 3 except for the structure in which silicon (Si) was employed as the substrate and $YBa_2Cu_3O_{7-x}$ of a thickness of 200 nm was used as the oxide.

Figure 9:
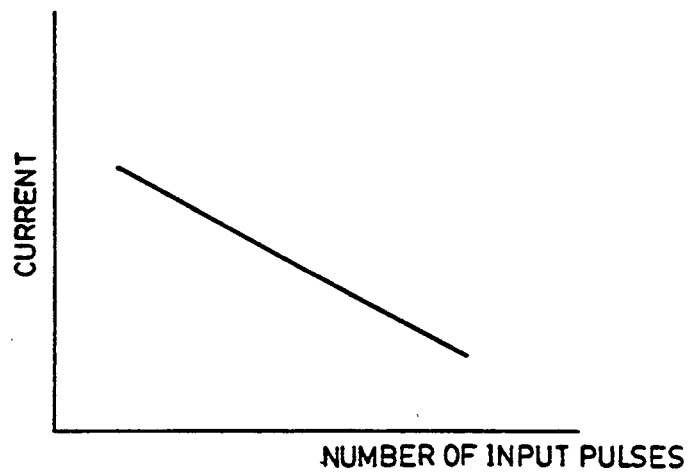

Information was recorded in the thus formed storage medium similarly to Example 3 except a pulse voltage (the width of the pulse was 5 ns) of 2. V was applied between the electrodes (6) and (3). The level of the electric current passing between the electrodes (1) and (3) was changed as shown in FIG. 9 in accordance with the number of pulses applied. Since the number of the pulses applied and the electric current passing between the electrodes held a relationship of 1:1, information could be stored in the multi-valued manner.

EXAMPLE 5

Figure 10:
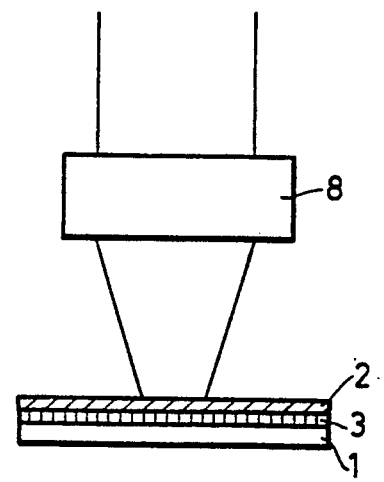

The storage medium which was arranged to be the same as that according to Example 4 was used. As shown in FIG. 10, a variety of images were formed on the storage medium by means of a lens (8) where the time of exposure was 1/60 second. Then, the storage medium was scanned by the needle electrode similarly to that according to Example 4 so that the image similar to that formed on the storage medium was reproduced. This means that the oxygen quantity in the storage medium was changed in accordance with the light quantity applied to the storage medium.

The needle electrode was fastened to a scanning mechanism (omitted from illustration) capable of moving in directions X, Y and Z so that it could be positioned in direction Z at a resolving power of $10^{-3}$ nm, while the same could be positioned in directions X and Y at a resolving power of 0.02 nm.

EXAMPLE 6

FIG. 11 illustrates a first embodiment of an apparatus for executing the storage method according to the present invention. Reference numeral 11 represents a stage and 12 represents a storage medium secured to the stage (11). Reference numeral 13 represents a coarse adjustment mechanism for moving the stage (11) in directions X, Y and Z. Reference numeral 14 represents a" circuit for operating the coarse adjustment mechanism (13). Reference numeral 16 represents a micro-adjustment mechanism for adjusting the height and the position of the needle probe, the micro-adjustment mechanism being operated by a piezoelectric element. Reference numeral 17 represents a signal detection circuit, 18 represents a micro-adjustment mechanism, and 19 represents a circuit for applying storage pulse voltage. The elements given the reference numerals 14, 17, 18 and 19 are controlled by a microcomputer (10). The portion around the storage medium (12) and that around the needle probe (15) are maintained to a nitrogen ambience.

The needle probe (15) was manufactured by mechanically grinding the front portion of a $\phi1$ tungsten needle so as to form a conical shape and by applying storage electric field thereto in a ultra high vacuum so as to vaporize the atoms on its surface.

The storage medium was formed by forming 3000 Å thick Y-Ba-Cu-O thin film on a MgO single crystal substrate by the RF spattering method. Then, it was gradually cooled down at 5K/min after it had been retained at 900° C. in an oxygen. Cr and Au serving as electrodes were formed at its end portion so as to respectively form a 5,000 Å film and a 1,000 Å film by the vacuum evaporation method.

The micro-adjustment mechanism of the needle probe (15) of the apparatus according to this example was structured by a conventional technology and capable of controlling the position at a resolving power of about 1 Å.

The apparatus according to this example stored information as follows: the needle probe 15 was positioned at a predetermined upper portion of the storage medium (12), and then the height of the needle probe was adjusted. At this time, a voltage of 1 V was applied between the needle probe (15) and the storage medium (12) so as to make the tunnellig current to become $10^{-9}$A. Then, pulses were applied between the needle probe (15) and the storage medium (12) so that information was stored in the storage medium (15), where the pulses of 10 V were applied for a time period of 1 μsec.

The reading of information by using the apparatus according to this example was performed as follows: after the position and the height of the needle probe (15) had been adjusted in the similar manner to the aforesaid method, the height of the needle probe (15) was vibrated by a proper amplitude (it was 1 Å here) and the change in the tunnel current is made in synchronization with the above-described vibrations so as to be read with a lock-in amplifier. The levels of the read signals differed by about 10 times between the case in which information had been stored and the case in which no information had been stored. Therefore, the discrimination of the signal level could be conducted.

The levels of the detected signals also differed between the case in which the pulses were applied once and the case in which the pulses were applied twice. Therefore, the multi-leveled storage of information could be conducted by utilizing the above-described difference.

EXAMPLE 7

According to this example, information was stored by a method shown in FIG. 12. Reference numeral 25 represents an imaging optical system, 26 represents a shutter and 27 represents the storage medium which is the same as that according to Example 6. When the shutter (26) was released, an image was formed on the storage medium (27) and the characteristics of the oxide thin film were changed at each of the positions on the storage medium in accordance with the light quantity.

The reading of information was performed similarly to the method according to Example 6. Information could be successively stored and the thus stored information could be read at a resolving power permitted by the control accuracy of the above-described needle probe. Furthermore, the successive scanning of information could be performed with the needle probe being scanned.

According to this method, a large quantity of information such as video image could be immediately input.

EXAMPLE 8

Figure 13:
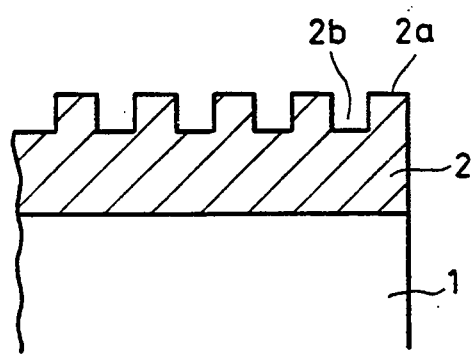
Figure 13:
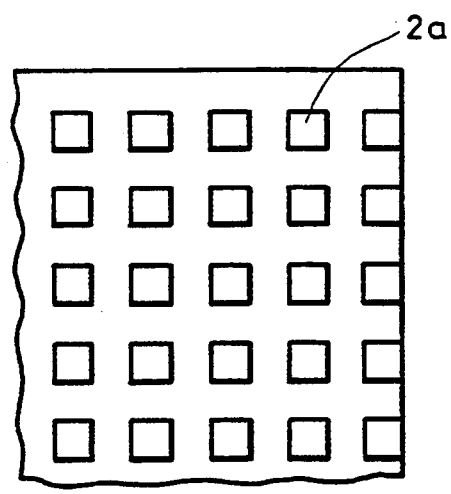

The storage medium according to this example was formed in such a manner that a 5,000 Å thin film of Y-Ba-Cu-O was, as shown in FIG. 13, formed on the MgO single crystal substrate (1) before being subjected to the heat treatment similarly to Example 6. Then, grooves (2b) of a width of 0.2 μm were formed by the electron beam drawing method so as to form a grid shape.

FIG. 13B is a top view. The projections (2a) shown in this drawing were arranged to be the recording pits.

The overall structure of the apparatus was arranged to be similar to that according to Example 6, where the needle probe was brought into contact with the surface of the storage medium and pulses of 10 v per pulse were applied for 1 μsec between the needle probe and the storage medium.

When information was read, the needle probe was similarly brought into contact with the recording pits and an A.C. or D.C. bias voltage was applied so as to measure the passing current.

Since a high resistance portion was formed on the surface of the pits due to the low oxygen current, the level of the passing current was a small level.

EXAMPLE 9

A storage medium as shown in FIG. 2B was manufactured.

A Cr film of a thickness of 100 Å and an Au film of a thickness of 1000 Å were formed (the electrode 3) on a quartz substrate (the substrate 1) by the resistance heating method. Then, an Er-Ba-Cu-O film (2) was layered (the oxide conductive layer 2) by 1 mm by the RF magnetron spatter method. The film was formed in a condition in which the temperature of the substrate was 300° C. It was then formed so as to have the pits and projections of a 1 μm pitch and height of 6000 Å as shown in FIG. 2 by the usual photolithgraph technology. The electrical resistivity of the thus manufactured Er-Ba-Cu-O film was measured. An electrical resistivity of 10 Ω cm was displayed.

Figure 16:
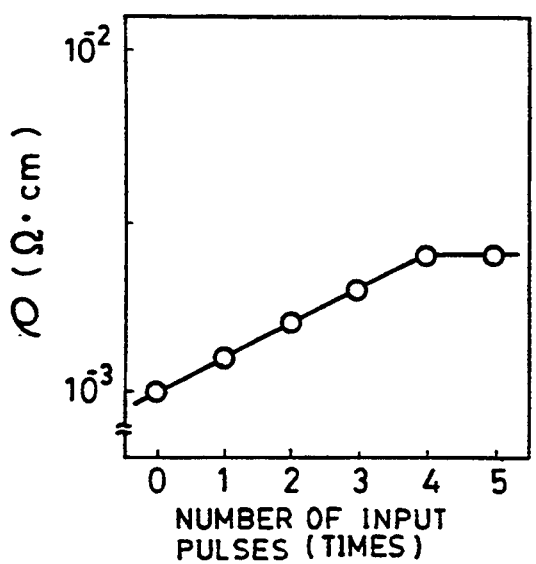

The writing of information on the thus formed storage medium was performed by using a tungsten needle electrode after the pressure around the storage medium had been lowered to $8 \times 10^{-3}$ torr. The distance from the front portion of the needle electrode to the projection portion of the oxide conductive layer (2) was made 10 to 20 Å so as to be applied pulses with voltage of 10 V. As a result, a portion of the projection portion of the oxide conductive layer (2) was heated, causing its electrical resistivity to be changed. The relationship between the number of the applications of the voltage pulses and the electrical resistivity is shown in FIG. 16.

Then, a multiplicity of projection portions whose characteristics had been changed were formed by performing the scanning with the needle electrode in the direction XY so that the large capacity multi-valued information could be written.

The thus written information could be deleted by heating it at 250° C. in atmospheric air.

EXAMPLE 10

The storage medium as shown in FIGS. 17A and 17B was manufactured.

Figure 15:
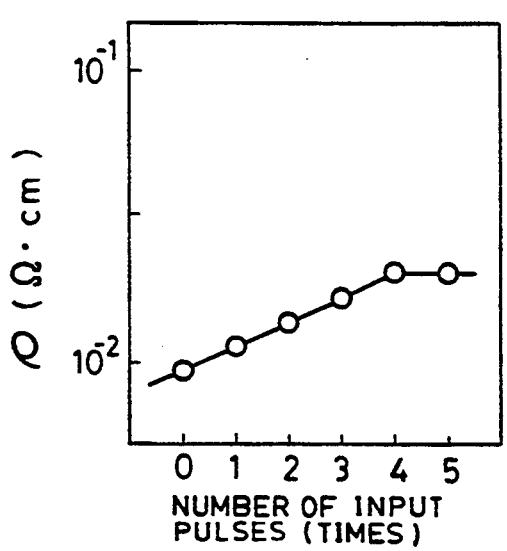
Figure 17:
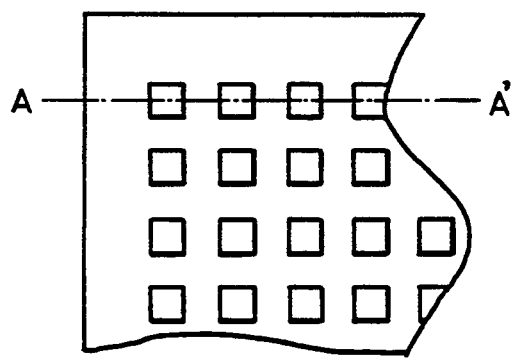
Figure 17:
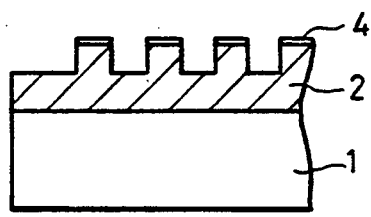
Figure 19:
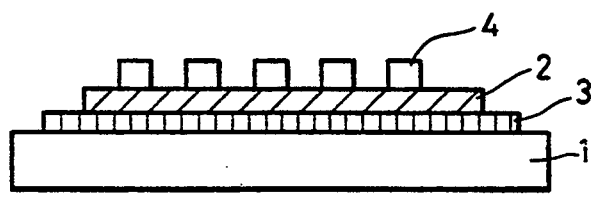

According to this example, the substrate 1 made of MgO was used. Then the Y-Ba-Cu-O film was formed on the MgO substrate 1 by the ionized cluster beam method so that the oxide conductive film (2) was formed. The film forming conditions were as follows: Y, BaO and Cu were independently used as the source of the evaporation, Y was ionized with an ionizing current of 50 mA and a accelerating voltage of 0.5 kV, Bao and Cu were ionized with an ionizing current of 100 mA and an accelerating voltage of 1 kV and the temperature of the substrate was made 420° C. The film was formed with an oxygen gas applied thereto so that a film of a thickness of 6,000 Å was formed. Then, silver of an oxygen permeable substance was formed so as to serve as the protection layer (4) and to have a thickness of 1,000 Å by the usual resistance heating method. Then, the pits and projections of a pitch of 0.5 μm and a height of 0.5 μm were formed as shown in FIG. 17 by the usual micro-machining process. The result of the measured electrical resistivity was $1 \times 10^{-3}$ Ωcm. Information can be written in the thus manufactured storage medium similarly to Example 9. In this case, the distance between the protection layer (4) of the storage medium and the needle electrode was 50 Å and the voltage to be applied was 50 V. The number of the applications of pulses and the electrical resistivity are shown in FIG. 15.

According to this example, since the protection layer (4) was formed, the oxide conductive layer (2) could be physically protected.

Information thus stored could be deleted by a heat at 250° C.

EXAMPLES 11 AND 12

The storage medium shown in FIG. 18 was manufactured in the manner similar to that according to Examples 9 and 10 with materials shown in Table 1 used so as to form the substrate (1), the electrode (3), the oxide conductive layer (2) and the protection layer (4). The electrode (3) was manufactured by a usual evaporation method. The oxide conductive layer (2) was manufactured similarly to Example 10 and by joined cluster beam method. Then, the pits and projections having a pitch of 0.4 μm and a height of 1 μm were formed by the micro-machining method. The pits and the projections were formed in a swirl shape starting from the center of the substrate (1). The protection layer 4 was manufactured by any method selected from the evaporation method, the spin coat method and the like.

According to Example 11, silicon oil, which is an oxygen permeable material, was used to form the-protection layer (4). According to Example 12, Al capable of absorbing oxygen was used to form the protection layer (4).

According to Example 11, information could be written and deleted similarly to Example 10.

According to Example 12, oxygen contained in the oxide conductive material was diffused due to heat and was absorbed into the protection layer (4) when information was written similarly to Example 10.

Stored information could not be deleted, because oxygen was absorbed into the protection layer when information was written.

TABLE 1

| Example | Substrate | Electrode | Oxide conductive Material | Protection Layer |
|---|---|---|---|---|
| 11 | Glass (Coning 7059) | Cu—Au | Y—Ba—Cu—O | Silicon oil |
| 12 | Si(100) | — | Ho—Ba—Cu—O | Al |

EXAMPLE 13

The storage medium shown in FIG. 1B was manufactured. Glass (Coning 7059) was employed to serve as the substrate (1) and a Cr film of 30 Å and an Au film of 500 Å were layered on the substrate (1) by the resistance heating method so that the electrode (3) was formed. Furthermore, a Y-Ba-Cu-O film of 3000 Å was layered on it by the RF magnetron spattering method so that the oxide conductive layer (2) was formed. The films were formed by using a $5 \times 10^{-3}$ Torr spattering gas consisting of 50% of Ar and 50% of $O_2$ with energy of the spattering power made 150 w and temperature of the substrate made 300° C. The thus formed Y-Ba-Cu-O film displayed an electrical resistivity of 1 Ωcm.

Information was written in the thus manufactured storage medium by using a tungsten needle electrode after the pressure around the storage medium had been lowered to $10^{-3}$ torr. The distance between the front portion of the needle electrode and the oxide conductive layer (2) was made about 15 Å and voltage pulses of 5 V were applied between the needle electrode and the oxide conductive layer (2). As a result, a portion of the oxide conductive layer (2) was heated, causing the electrical resistivity to be changed.

Figure 14:
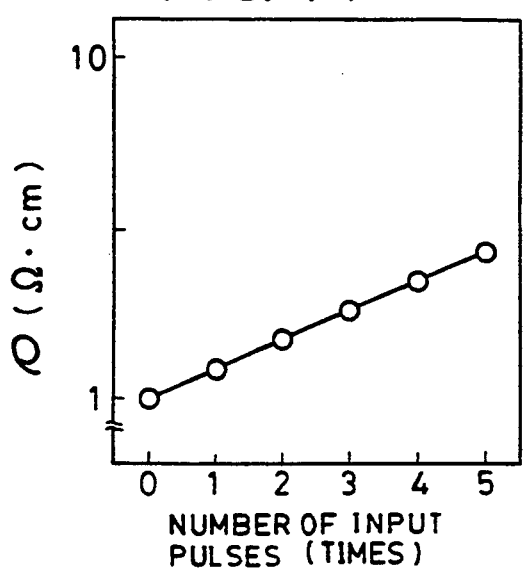

The relationship between the number of applications of the voltage pulses and the change in the electrical resistivity is shown in FIG. 14. A multiplicity of portions whose characteristics had been changed were formed by performing the scanning with the needle electrode in the direction XY so that a large quantity of multi-valued information were written in the storage medium.

According to this example, the storage capacity is determined in accordance with the shape of the front portion of the needle electrode and the positioning accuracy of the needle electrode. Since the front portion of the needle electrode usual has the curvature radius of 1 nm, the memory cell has the similar size. Furthermore, the accuracy in positioning can be made to a resolving power of about 0.02 nm.

Information stored could be deleted by heat of 250° C.

EXAMPLE 14

The storage medium shown in FIG. 1A was manufactured.

$TiSrO_3$ is employed to form the substrate 1 and a Y-Ba-Cu-O film was layered by the ionized cluster beam method so that the oxide conductive layer (2) was formed. The films were formed by using Y, BaO and Cu as the evaporation source. Y was ionized with an ionizing current of 50 mA and an accelerating voltage of 0.5 kV, and BaO and Cu were ionized with an ionizing current of 100 mA and an accelerating voltage of 1 kV. The temperature of the substrate was arranged to be 420° C. at this time. The films were formed with an oxygen gas of $4 \times 10^{-4}$ Torr applied thereto. The film thickness was arranged to be 1000 Å. The thus formed Y-Ba-Cu-O film displayed an electrical resistivity of $1 \times 10^{-2}$ Ωcm.

Similarly to Example 13, information could be written in the thus formed storage medium. The distance between the needle electrode and the oxide conductive layer 2 was arranged to be about 10 Å and the voltage applied was arranged to be 5 V. The relationship between the number of pulses applied and the electrical resistivity is as shown in FIG. 16.

Information stored could be deleted similarly to Example 13.

EXAMPLE 15

Similarly to Example 13, a storage medium was manufactured, MgO single crystal was employed as the substrate (1), Ag (thickness 500 Å) was employed as the electrode (2), the Y-Ba-Cu-O film was employed as the oxide conductive layer (2), and the film forming condition of the temperature of the substrate was 500° C. The film thickness, and the compositions of the materials were made the same as those according to Example 13. The thus formed Y-Ba-Cu-O film displayed an electrical resistivity of $1 \times 10^{-3}$ Ωcm.

Substantially similarly to Example 13, information could be written in the thus manufactured storage medium. The relationship between the number of pulses applied and the electrical resistivity becomes as shown in FIG. 16.

Information stored could be deleted by heating to 300° C. in atmospheric air.

EXAMPLE 16

The storage medium shown in FIG. 3B was manufactured. Similarly to Example 14, the electrode (3) and the oxide conductive layer (2) were formed on the base (1), and Ag serving as the protection film (4) were further formed. The thus formed Ag layer was made to have a thickness of 100 Å by the resistance heating method.

Since the protection film of the storage medium according to this embodiment was made of Ag, it displayed the oxygen permeability. Therefore, the writing and deletion of information could be conducted similarly to Example 14 with excellent stability against deterioration due to lapse of time.

EXAMPLE 17

Similarly to Example 16, the electrode (3) and the oxide conductive layer (2) were formed on the substrate (1), and the protection layer (4) made of Ti was further formed on it. The Ti layer was formed so as to have a thickness of 500 Å by the EB evaporation method.

Since the storage medium according to this example had the protection film (4) made of Ti, oxygen were diffused into the protection film (4). Therefore, information could be written similarly to Example 16. According to this example, oxygen removed from the oxide conductive layer (2) was diffused into the protection film (4) so that TiOx was formed. Therefore, the necessity of writing in the vacuum space could be eliminated. Furthermore, the stability could be improved.

Embodiment 18

The storage medium shown in FIG. 21 was manufactured. Similarly to Example 15, the electrode (3) and the oxide conductive layer (2) were formed on the substrate (1). An Ag film of 50 Å was further layered on it by the resistance heating method. Then, only the Ag film was patterned by the photolithograph method so that the protection layer (4) of a size 0.3 μm×0.3 μm were arranged to have intervals of 0.3 μm.

Similarly to Example 15, writing and deletion of information to and from the storage medium thus manufactured could be performed. Since Ag has an oxygen permeable characteristic, oxygen could be introduced and discharged from the oxide conductive layer (2) similarly to the example 15 in which no Ag was employed. Furthermore, since the protection layer (4) served as a marker at the time of reading, the reading accuracy could be improved.

The individual components shown in outline or designated by block in the drawings are well known in the information storage field, and their specific construction and operation are not critical to the operation or best mode for carrying out the invention. While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

We claim:

1. A method for storing information comprising the following steps:
    (a) preparing a storage medium comprising an oxide layer; and
    (b) exposing portions of the oxide layer to light to heat the oxide layer in accordance with information signals; thereby forming a plurality of portions containing varying quantities of oxygen, wherein information is stored.

2. A storage method according to claim 1, wherein step (b) further comprises a step in which the light is applied to said oxide layer by a digital exposure.

3. A storage method according to claim 1, wherein step (b) further comprises a step in which the light is applied by an analog exposure.

4. A storage method according to claim 1, wherein step (a) further comprises a step wherein said oxide layer surface comprises a plurality of pits and projections.

5. A storage method according to claim 4, further comprising a step wherein the pits and projections are positioned such that the distance between said projections is in the rate of substantially 1 μm to 4000 Å.

6. A storage method according to claim 4, further comprising a step wherein said pits and projections are positioned such that a height of said projections is in the range of substantially 3 μm to 2000 Å.

7. A storage method according to claim 1, wherein step (a) further comprises a step in which said oxide layer is held between a substrate and a protection layer.

8. A storage method according to claim 7, further comprising a step wherein said protection layer comprises an oxygen permeable material.

9. A storage method according to claim 7, further comprising a step wherein said protection layer comprises an oxygen absorbable material.

10. A storage method according to claim 7, further comprising a step wherein said oxide layer surface comprises a plurality of pits and projections.

11. A storage method according to claim 8, further comprising a step wherein the pits and projections are positioned such that the distance between said projections is in the range of substantially 1 μm to 4000 Å.

12. A storage method according to claim 8, further comprising a step wherein said pits and projections are positioned such that a height of said projections is in the range of substantially 3 μm to 2000 Å.

13. A storage method according to claim 1, wherein step (a) further comprises a step in which said oxide layer comprises an oxide which changes crystalline structure in response to a change in a quantity of oxygen contained therein.

14. A method for reading stored information comprising the following steps:
    (a) applying voltage to a medium comprising an oxide layer, wherein said oxide layer includes a plurality of portions containing varying oxygen concentrations; and
    (b) detecting an electrical resistance of each of said plurality of portions, wherein the electrical resistance of each of said plurality of portions relates to the oxygen concentration of the portion, whereby information is read.

15. A method for reading stored information according to claim 14, wherein step (a) further comprises a step wherein said oxide layer surface comprises a plurality of pits and projections.

16. A method for reading stored information according to claim 14, further comprising a step wherein said pits and projections are positioned such that a distance between said projections is in the range of substantially 1 μm to 4000 Å.

17. A method for reading stored information according to claim 15, further comprising a step wherein said pits and projections are positioned such that a height of said projections is in the range of substantially 3 μm to 2000 Å.

18. A method for reading stored information according to claim 14, wherein step (a) further comprises a step in which said oxide layer is held between a substrate and a projection layer.

19. A method for reading stored information according to claim 18, further comprising a step wherein said protection layer comprises an oxygen permeable material.

20. A method for reading stored information according to claim 18, further comprising a step wherein said protection layer comprises an oxygen absorbable material.

21. A method for reading stored information according to claim 18, further comprising a step wherein said oxide layer surface comprises a plurality of pits and projections.

22. A method for reading stored information according to claim 21, further comprising a step wherein said pits and projections are positioned such that the distance between said projections is in the range of substantially 1 μm to 4000 Å.

23. A method for reading stored information according to claim 21, further comprising a step wherein said pits and projections are positioned such that a height of said projections is in the range of substantially 3 μm to 2000 Å.

24. A method for reading stored information according to claim 14, wherein step (a) further comprises a step in which said oxide layer comprises an oxide which changes crystalline structure in response to a change in a quantity of oxygen contained therein.

25. A method for reading stored information comprising the following steps:
(a) applying light to medium comprising an oxide layer, wherein said oxide layer includes a plurality of portions containing varying oxygen concentrations; and
(b) detecting a light reflectivity of each of said plurality of portions, wherein said light reflectivity of each of said plurality of portions relates to the oxygen concentration of the portion, whereby information is read.

26. A method for reading stored information according to claim 25, wherein step (a) further comprises a step wherein said oxide layer surface comprises a plurality of pits and projections.

27. A method for reading stored information according to claim 26, further comprising a step wherein said pits and projections are positioned such that a distance between said projections is in the range of substantially 1 $\mu$m to 4000 Å.

28. A method for reading stored information according to claim 26, further comprising a step wherein said pits and projections are positioned such that a height of said projections is in the range of substantially 3 $\mu$m to 2000 Å.

29. A method for reading stored information according to claim 25, wherein step (a) further comprises a step in which said oxide layer is held between a substrate and a protection layer.

30. A method for reading stored information according to claim 29, further comprising a step wherein said protection layer comprises an oxygen permeable material.

31. A method for reading stored information according to claim 29, further comprising a step wherein said protection layer comprises an oxygen absorbable material.

32. A method for reading stored information according to claim 29, further comprising a step wherein said oxide layer surface comprises a plurality of pits and projections.

33. A method for reading stored information according to claim 32, further comprising a step wherein said pits and projections are positioned such that a distance between said projections is in the range of substantially 1 $\mu$m to 4000 Å.

34. A method for reading stored information according to claim 32, further comprising a step wherein said pits and projections are positioned such that a height of said projections is in the range of substantially 3 $\mu$m to 2000 Å.

35. A method for reading stored information according to claim 25, wherein step (a) further comprises a step in which said oxide layer comprises an oxide which changes crystalline structure in response to a change in a quantity of oxygen contained therein.

* * * * *

UNITED STATES PATENT AND TRADEMARK OFFICE
CERTIFICATE OF CORRECTION

PATENT NO. : 5,335,197
DATED : August 2, 1994
INVENTOR(S) : Kaneko et al.

It is certified that error appears in the above-indentified patent and that said Letters Patent is hereby corrected as shown below: Title Page:

At [56] References Cited

FOREIGN PATENT DOCUMENTS

Insert --63-268087  11/1988  Japan
              0197256  10/1986  European Patent Office
              0177311  04/1986  European Patent Office
              1088117  10/1967  Great Britain--.

U.S. PATENT DOCUMENTS

Insert --4,920,007  04/1990  Sawamura et al.  428/457
              4,871,601  10/1989  Miura et al.     428/64
              4,737,947  04/1988  Osato et al.     369/13
              4,710,418  12/1987  Takano et al.    428/192
              4,618,537  10/1986  Takano et al.    428/336
              4,578,322  03/1986  Sawamura et al.  428/694
              4,091,171  05/1978  Ohta et al.      428/539
              3,483,531  12/1969  de Rudnay        340/173
              3,461,436  08/1969  Navon et al.     428/457--.

Column 3

Line 42, "are" should read --is--.

Column 4

Line 58, "Voltage" should read --voltage--.

Column 7

Line 10, "t, he" should read --the--.

UNITED STATES PATENT AND TRADEMARK OFFICE
CERTIFICATE OF CORRECTION

PATENT NO. : 5,335,197
DATED : August 2, 1994
INVENTOR(S) : Kaneko et al.

It is certified that error appears in the above-indentified patent and that said Letters Patent is hereby corrected as shown below:

Column 8

Line 7, "enlarged than" should read --higher than--;
Line 34, "3bwas" should read --3b was--;
Line 56, "was" should read --were--; and
Line 59, "Coning" should read --Corning--.

Column 9

Line 4, "the portion" should read --in the portion--; and
Line 5, "to pass" should read --passed--.

Column 10

Line 17, "an" should be deleted; and
Line 32, "tunnellig" should read --tunnelling--.

Column 11

Line 24, "10v" should read --10V--.

Column 12

Line 38, "a" should be deleted.

Column 13

Line 9, "(Coning 7059)" should read --(Corning 7059)--;

UNITED STATES PATENT AND TRADEMARK OFFICE
CERTIFICATE OF CORRECTION

PATENT NO. : 5,335,197  
DATED : August 2, 1994  
INVENTOR(S) : Kaneko et al.

It is certified that error appears in the above-indentified patent and that said Letters Patent is hereby corrected as shown below:

Line 15, "(Coning 7059)" should read --(Corning 7059)--; and  
    Line 24, "150 w" should read --150 W--.

Column 14

Line 56, "were" should read --was--; and  
    Line 64, "Embodiment 18" should read --EXAMPLE 18--.

Column 15

Line 4, "were" should read --was--;  
    Line 11, example 15" should read --Example 15--.

Column 16

Line 4, "claim 8," should read --claim 10,--;  
    Line 8, "claim 8," should read --claim 10,--; and  
    Line 34, "claim 14," should read --claim 15,--.

Signed and Sealed this

Eighteenth Day of April, 1995

Attest:

BRUCE LEHMAN

*Attesting Officer*       *Commissioner of Patents and Trademarks*

UNITED STATES PATENT AND TRADEMARK OFFICE
CERTIFICATE OF CORRECTION

PATENT NO. : 5,335,197
DATED : August 2, 1994
INVENTOR(S) : Kaneko et al.

It is certified that error appears in the above-indentified patent and that said Letters Patent is hereby corrected as shown below: On the title page, item:

[75] <u>Inventors</u>:

"Katsuhiko Shinsho" should read --Katsuhiko Shinjo--.

Signed and Sealed this

Sixteenth Day of July, 1996

Attest:

BRUCE LEHMAN

*Attesting Officer*      *Commissioner of Patents and Trademarks*